Patented Jan. 16, 1934

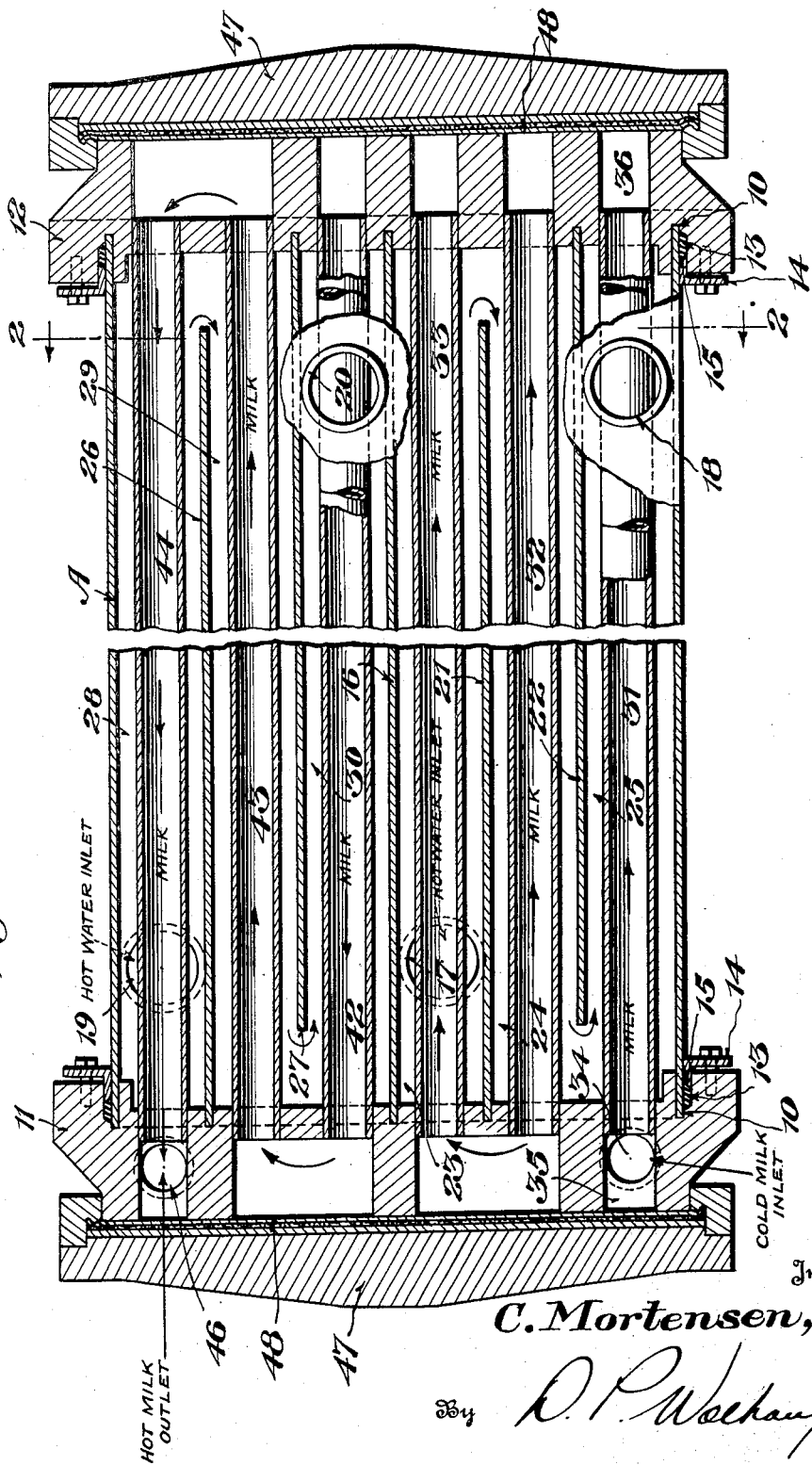

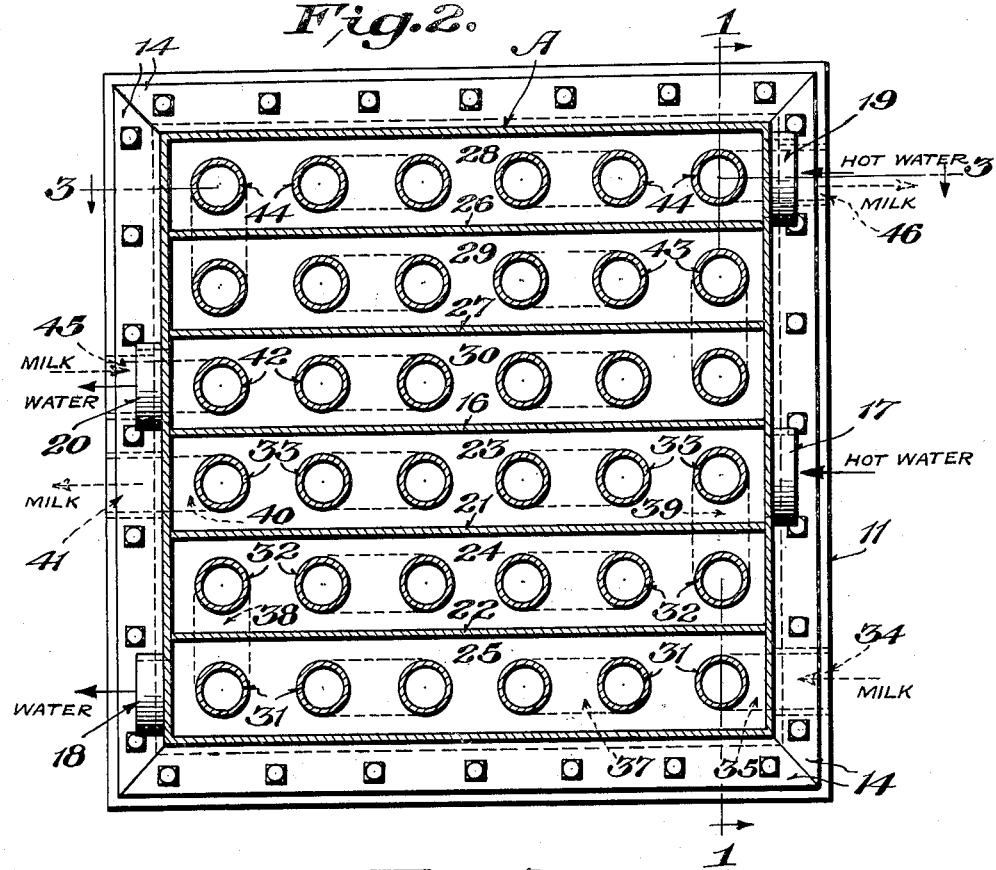
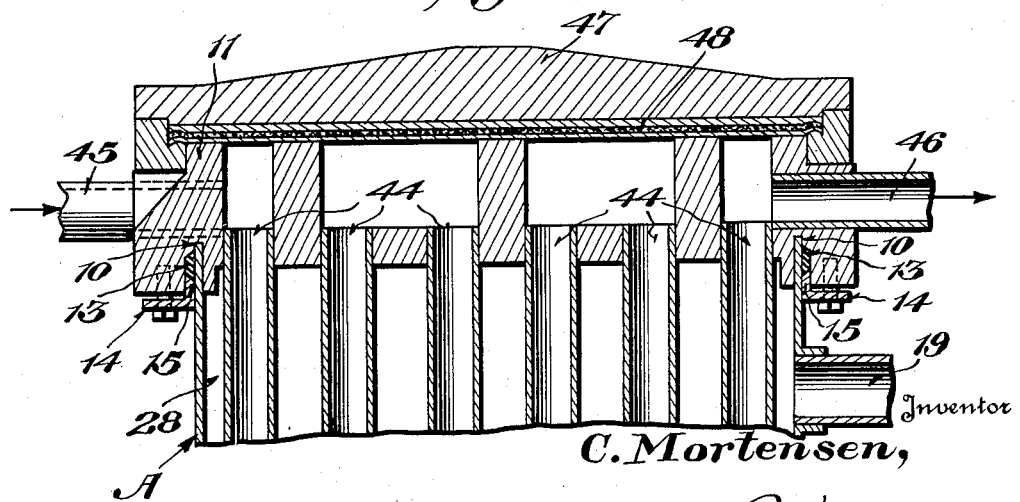

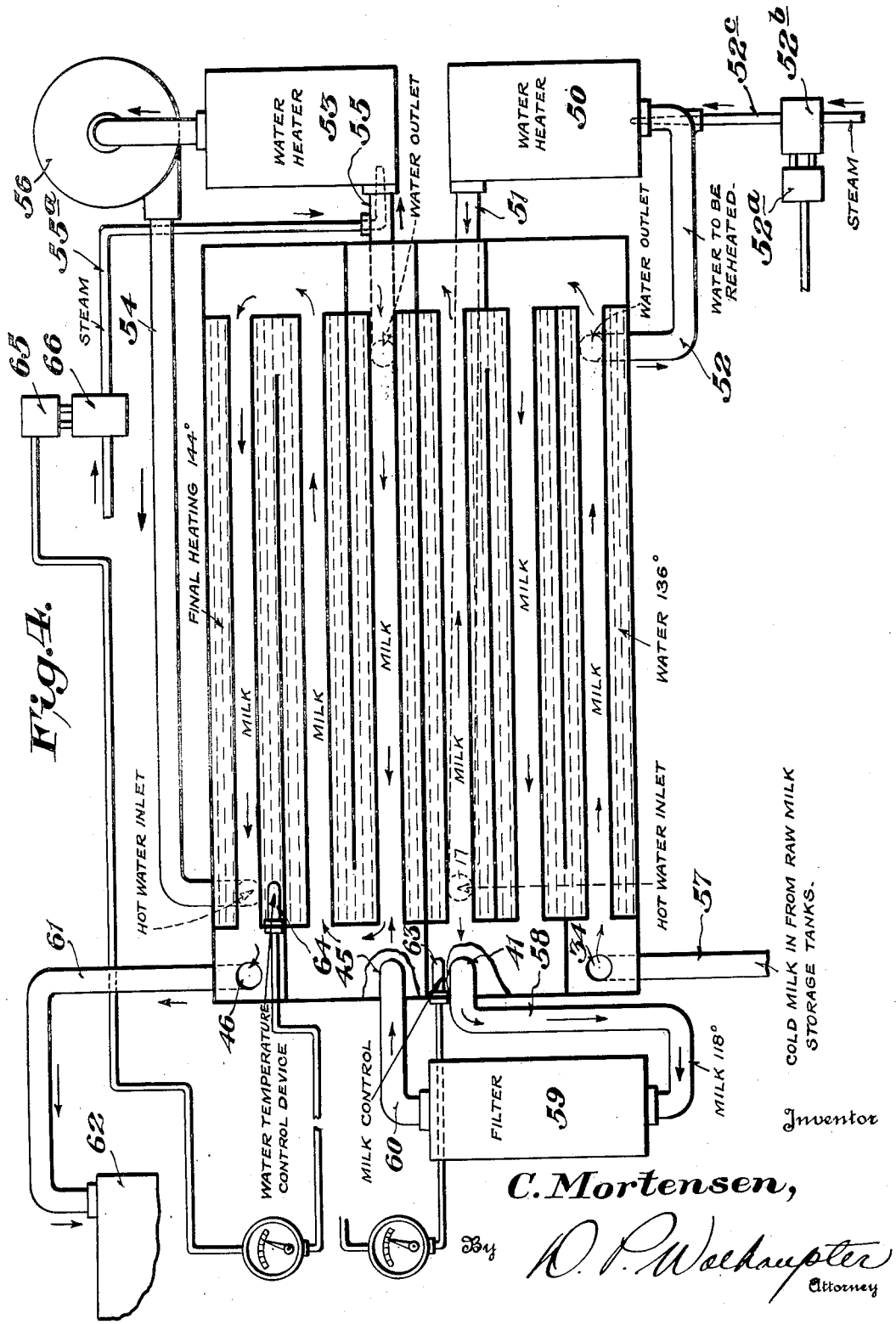

1,943,484

UNITED STATES PATENT OFFICE 1,943,484

HEAT EXCHANGE APPARATUS

Cornelius Mortensen, Louisville, Ky.

Application June 9, 1931. Serial No. 543,213

6 Claims. (Cl. 257—240)

This invention relates to apparatus for treating milk for flash pasteurization or preparatory to delivery of the same to a holder or other device for time pasteurization, and has generally in view to provide apparatus by means of which the temperature of the milk may be accurately controlled and a relatively large volume of milk treated economically within a relatively short period of time by apparatus occupying only a relatively small amount of space.

According to the present invention the method resides generally in first raising the temperature of the raw milk taken from the storage tanks to approximately 118° F., (which is the temperature best suited for filtration or clarification purposes) filtering or clarifying the milk at this approximate temperature, raising the temperature of the filtered or clarified milk to a temperature of substantially 144° F. prior to delivery of the same for flash pasteurization or to a holder or other device for time pasteurization, and so controlling the raising of the temperature as to avoid exceeding the pasteurization temperature at any time, whereby scorching or overheating of the milk is avoided and whereby the food values of the vital elements thereof are unaffected by the heat treatment.

In treating milk according to the foregoing method, a special object of the invention is to provide a heat exchange apparatus involving a novel structural arrangement of elements whereby a major amount of heating efficiency is obtained from the heating medium, and whereby a relatively large volume of the heating medium may be circulated about the milk conduits in an apparatus having comparatively small dimensions.

Another special object of the invention is to provide an apparatus involving a novel construction adapting the same to be easily and economically produced and to be maintained liquid tight despite contraction and expansion thereof due to temperature changes.

Various other objects as well as the nature and the advantages of the invention will become more fully apparent from the following description considered in connection with the accompanying drawings, in which:—

Figure 1 is a vertical section through the heat exchange device of the invention according to one practical embodiment of such device, the section being taken on the line 1—1 of Fig. 2.

Figure 2 is a transverse section taken on the line 2—2 of Fig. 1.

Figure 3 is a fragmentary horizontal section taken on the line 3—3 of Fig. 2; and Figure 4 is a diagrammatic view illustrating apparatus comprising substantially the complete system.

Referring particularly to the heat exchange device illustrated in detail in Figs. 1 to 3 of the drawings, it will be observed that the same is inclusive essentially of a casing A which may be of any suitable length and which preferably is of rectangular shape in cross section and of any suitable height and width.

The ends of the casing A are received in grooves 10 formed in the inner faces of headers 11 and 12, respectively, and in accordance with the invention these grooves are formed of greater width than the thickness of the walls of the casing whereby, as illustrated in Figs. 1 and 3, packing material 13 is adapted to be disposed within said grooves against the outer faces of the casing walls and to be retained therein by flanged gland elements 14 bolted or otherwise adjustably connected with the headers and having portions 15 extending into the grooves into engagement with the respective packings, whereby the latter are adapted to be maintained compressed to maintain tight joints between the casing ends and the headers regardless of all normal contraction and expansion and consequent relative movement between the casing and the headers.

A partition 16, disposed horizontally in this instance and extending from side to side and end to end of the casing A, with its sides welded or otherwise secured to the sides of the casing and its ends received in grooves in the headers, or otherwise suitably connected with the latter, divides said casing into two separate compartments located one at the bottom and the other at the top thereof, and in accordance with the invention it will be observed by particular reference to Fig. 1 of the drawings that a hot water inlet 17 for the lower compartment is provided in one of the side walls of the casing A adjacent to the top and near one end of said compartment and that a water outlet 18 from said compartment is provided in the opposite side wall of the casing adjacent to the bottom and near the other end of the compartment, the said inlet and outlet openings 17 and 18 being disposed in this instance adjacent to the headers 11 and 12, respectively.

In the same manner, a hot water inlet 19 for the upper compartment is provided in the same side wall of the casing A as the hot water inlet for the lower compartment and is disposed adjacent to the top of said upper compartment and near the header 11, while a water outlet 20 for the upper compartment is, like the outlet for the lower compartment, provided in the same side wall of the casing as the latter outlet adjacent to the bottom of the upper compartment and near the header 12.

By further reference to Figs. 1 and 2 it will be observed that a horizontal partition 21 extends from side to side of the casing A within the lower compartment below the hot water inlet 17 thereof and from the header 11 to a point in spaced relation to the header 12, while below said partition 21 and above the bottom of the casing and above the water outlet 18, a second horizontal partition 22 extends across the casing from side to side thereof and from the header 12 to a point in spaced relation to the header 11. Thus, as is manifest, the partitions 21 and 22 cooperate with each other, and with the partition 16 and the bottom wall of the casing, respectively, to provide three distinct passageways 23, 24 and 25 extending from side to side of the casing and substantially from end to end thereof, so that, as viewed in Fig. 1, hot water entering the inlet 17 at one side and one end of the casing, is required to flow first to the right through the passageway 23 to the other end of the casing, thence downward and into the passageway 24 and to the left therethrough to the first mentioned end of the casing, and finally downward into the passageway 25 and therethrough again to right before it may escape through the outlet 18 at the opposite side of the casing.

The upper compartment is divided in the same manner by a pair of partitions 26 and 27 into three distinct passageways 28, 29 and 30, and hot water entering through the inlet 19 is required to flow through said passageways in the same manner as described in connection with the lower compartment passageways before it may escape through the outlet 20.

Arranged within the passageway 25 is a horizontal series of milk tubes 31 which are laterally spaced from each other and extend in parallel relation from end to end of said passageway, being engaged at their ends in openings formed in the headers 11 and 12 and being sealed within said openings in any suitable manner. Similar series of tubes 32 and 33 are arranged in like manner in the passageways 24 and 23, respectively.

An inlet 34 for raw milk is provided in that side of the header 11 which is disposed at the side of the device having the hot water inlets 17 and 19, and said raw milk inlet is disposed in horizontal alinement with the series of milk tubes 31, being in communication through the recess 35 formed in the header 11 with the adjacent end of the tube 31 nearest the said side of the device through which the milk inlet enters the header. This first tube of the series of tubes 31 is, at its other end, in communication with the adjacent end of the second tube of the series through a recess 36 formed in the header 12, and said second tube is, in turn, in communication with the third tube through a recess 37 formed in the header 11, this arrangement being continued throughout the series of tubes 31 so that milk entering through the inlet 34 flows successively through said tubes first in one direction through the first tube, thence in an opposite direction through the second tube and so on until the last tube of the series is reached. The said last tube is in communication through a recess 38 in the header 11 with the first tube of the series of tubes 32 disposed in the passageway 24, and the tubes of this series are in communication with each other in the same manner as the tubes 31 through recesses formed in the respective headers, so that the flow of the milk continues successively through the tubes of the second series. The last tube of the second series is in communication through a recess 39 in the header 11 with the first tube of the series of tubes 33 disposed in the passageway 23, and, like the tubes 31 and 32, the tubes 33 of this third series are in communication with each other through recesses formed in the respective headers, whereby the flow of the milk continues successively through the tubes of the third series to the last tube of said series, which tube is in communication through a recess 40 in the header 11 with a milk outlet 41 formed in the side of said header opposite the side thereof in which the raw milk inlet 34 is provided.

Milk tubes are arranged in the upper compartment of the device in the same manner as in the lower compartment thereof. That is to say, horizontal series of laterally spaced, parallel tubes 42, 43 and 44 are provided in the passageways 30, 29 and 28, respectively, and extend from end to end of said passageways and have their ends suitably sealed in openings in the respective headers. However, in the case of the upper compartment, the milk inlet 45 is provided in that side of the header 11 opposite to the side thereof in which the milk inlet 34 is provided, or, in other words, in the same side of the header as the milk outlet 41, and directly above said outlet 41, so as to deliver milk to the adjacent end of the first tube of the lower series of tubes 42 of the upper compartment. Consequently, the recesses provided in the respective headers to provide communication between the tubes of the different series 42, 43 and 44 are so formed that the milk entering through the inlet 45 circulates successively back and forth through the tubes of the lower series 42, thence back and forth through the tubes of the series 43, and finally back and forth through the tubes of the upper series 44 to the last tube of said upper series, which tube is in discharging relation to a milk outlet 46 provided in the side of the header 11 opposite to the side thereof in which is provided the inlet 45.

In view of the foregoing it will be apparent that the milk in circulating from the milk inlet 34 of the lower compartment through the series of tubes 31, 32 and 33 to the milk outlet 41, is subjected first to the heating action of the water circulating through the passageways 23, 24 and 25 which is of lowest temperature, and finally to the heating action of the water which is of highest temperature, since the milk outlet is located adjacent to the hot water inlet. In other words, the general direction of circulation of the milk is counter to the general direction of circulation of the water, and this obviously is true of the upper compartment as well as the lower compartment.

It will also be apparent in view of the foregoing that by reason of the partitions in the respective compartments dividing the same into water passageways which extend from side to side of the casing, an exceptionally large volume of water may be circulated within a relatively short period of time around the milk tubes disposed in the passageways, whereby the milk may rapidly be raised to the temperature desired and consequently be circulated rapidly through the milk tubes. Thus, by the use of a heat exchange device constructed in the general manner shown and described, relatively large volumes of milk may obviously be treated within relatively short periods of time by a device of relatively small size.

The headers 11 and 12 recessed as described to provide communication between the various milk tubes, are most readily and most economically capable of being cast with the recesses thereof opening through their outer faces. Therefore, they are formed in this manner and end closures 47 provided at their inner faces with metallic gaskets 48 are hinged or otherwise mounted thereon to seat against the outer faces of the headers to close the outer ends of the recesses, this arrangement having the additional advantage that simply by removing the end closures the milk tubes and the headers are exposed for quick and thorough cleansing.

Obviously, as many partitions providing as many water passages as desired may be provided in each of the compartments of the device, and likewise as many milk tubes as desired may be provided in each water passageway, it being understood, of course, that in this connection the arrangement illustrated in the drawings is merely representative. Furthermore, it is not essential that the partitions and the water passageways be disposed horizontally, as they may readily be disposed vertically, and moreover, instead of dividing the device into two or more individual units by one or more partitions 16, it is apparent that in any instance the device may be constructed as a single unit in which both the water and the milk circulate in single continuous streams through the entire device. Again, it is not essential that the water and milk inlet and outlet openings be arranged in the exact manner shown and described, as said openings may obviously be arranged in various other ways, and while the device has been described as employed for the heat treatment of milk, it is apparent that the same may be employed for heating or cooling any other fluid, and that any desired heating or cooling medium other than water may be circulated therethrough.

Referring now particularly to the diagrammatic illustration in Fig. 4 of the system employing the present heat exchange device, it will be observed that a water heater designated as 50 has its water outlet connected by a pipe 51 with the water inlet 17 of the lower compartment of the device, and that the water outlet 18 from said compartment is connected by a pipe 52, with the water inlet of said heater. It will also be observed that a second water heater 53 has its water outlet connected by a pipe 54 with the inlet 19 of the upper compartment and its water inlet connected with the water outlet from said upper compartment by a pipe 55. Manifestly, therefore, the water for each of the compartments is in a closed circuit which includes means for reheating the water after it leaves the compartment and prior to its redelivery to the compartment. In this connection it is pointed out that a pump preferably is provided in each of the water circuits for positively effecting circulation of the water, one such pump, designated as 56, being shown interposed in the hot water supply pipe 54 for the upper compartment, the pump for the water circuit of the lower compartment not being shown merely because of lack of space and in order to avoid confusion.

At 57 is designated the raw milk supply pipe connected with the milk inlet 34 of the lower compartment of the device, while at 58 is designated the milk delivery pipe connected with the milk outlet 41 of said lower compartment. In accordance with the invention, this latter pipe, 58, leads to and is connected with the inlet side or end of a filtering or clarifying device designated as 59, while from the outlet side or end of said device 59 a pipe 60 leads to and is connected with the milk inlet 45 of the upper compartment, the milk outlet 46 of said upper compartment being connected by a pipe 61 with a holder or other device 62 in which pasteurization of the milk is to be effected.

The milk in its flow through the lower compartment or initial heating unit of the heat exchange device is adapted to be raised to a temperature of approximately 118° F. for delivery to the filtering or clarifying device 59 at this best suited temperature for filtration or clarifying purposes, and in order to assure delivery of the milk to said device at said temperature, a thermostatic control device 63 is disposed at a suitable point in the milk line, preferably adjacent to the outlet 41 from the initial heating unit, to indirectly actuate, through an electrical relay or other instrumentality, 52$^a$, a valve 52$^b$ interposed in a steam supply pipe 52$^c$ suitably arranged to deliver steam into the water heater 50, or into one or the other of the water pipes 52 or 51, to automatically regulate the flow of steam to the incoming heating water, thus to control the water temperaure and thereby maintain the milk delivered to the filter at said ideal temperature for filtration or clarification purposes.

After passing through the filtering or clarifying device 59 the milk in its circulation through the upper compartment or final heating unit of the device, is adapted to be raised to a pasteurizing temperature of substantially 144° F. prior to its delivery to the holder or flash pasteurization device as the case may be, and this is accomplished, by the circulation of hot water through the water passageways 28, 29 and 30. However, in the case of the upper compartment or final heating unit of the device, the regulation of the milk temperature is controlled by regulating the flow of steam to the heating water through the upper compartment by means of a thermostatic control device 64 suitably arranged to be actuated by the water itself. Preferably said control device is placed in the passageway 28 adjacent to the hot water inlet 19 and the milk outlet 46, and in accordance with the invention this device is adapted to actuate, through an electrical relay or other device 65, a valve 66 interposed in a steam supply pipe 55$^a$ suitably arranged to deliver steam into the water heater 53, or into one or the other of the water pipes 55 or 54, thus to automatically regulate the flow of steam to the incoming heating water to maintain the same at a temperature such as to maintain the milk delivered from the final heating unit at the aforesaid pasteurizing temperature of substantially 144° F. In this connection it is pointed out that due to the provision for circulating a large volume of water around the milk tubes, the milk, by the time it reaches the outlet 46, is raised to practically the same temperature as the incoming heating water. Consequently, by regulating the flow of steam to the incoming heating water to maintain the water in the intake end of the passageway 28 at a given temperature, the milk delivered through the outlet 46 will be maintained at practically the same temperature. Therefore, any danger of overheating or scorching of the milk is, by the use of present device, entirely eliminated, and when it is appreciated that the raising of the milk temperature as little as a single degree above the pasteurizing temperature may have an extremely undesirable effect on the milk, the value of this feature of the invention will be apparent. Moreover, it has been found in practice that because of the free uninterrupted path of flow for the water afforded by the large area water passageways extending through the device, only a relatively small amount of power is required to effect circulation of the water through the device, which obviously contributes materially to the economical operation of the device.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A heat exchange device comprising a casing, a partition within said casing dividing the same into two separate compartments, means dividing each compartment into a series of passageways each extending from side to side and substantially from end to end of the compartment, a separate means for the supply of a heat exchange medium into one of the terminal passageways of each compartment, means for the delivery of the heat exchange means from the opposite end of the other terminal passageway of each compartment, means whereby the heat exchange mediums are required to circulate substantially throughout the length of each passageway of the related compartment in their flow from said inlet means to said outlet means, respectively, and series of communicating conduits in the passageways of each of said compartments through which a medium to be heated or cooled is adapted to be circulated.

2. In a heat exchange device, a casing, headers closing the ends of said casing, means providing separate conduits within said casing for the flow of heat exchange mediums, respectively, the headers having grooves receiving the ends of said casing, respectively, said grooves being of greater width than the thickness of the casing walls, packing material within said grooves, and means retaining said packing material therein.

3. A heat exchange device comprising a casing, a partition within said casing dividing the same into two separate compartments, conduits within said compartments, one compartment having an inlet at the side thereof remote from the partition and an outlet adjacent to the partition, the other compartment having an inlet at the side thereof adjacent to the partition and an outlet at the side thereof remote from the partition, the conduits of the respective compartments being connected together adjacent to the inlet of the second mentioned compartment, the inlet of the connected conduits being located at the outlet side of the second mentioned compartment and the outlet of said connected conduits being located at the inlet side of the first mentioned compartment.

4. A heat exchange device comprising a casing, a partition within said casing dividing the same into two separate compartments, conduits within said compartments, one compartment having an inlet near one end of the casing and at the side thereof remote from the partition and an outlet near the other end thereof and adjacent to the partition, the other compartment having an inlet adjacent to the partition and near the same end of the casing as the inlet of the first compartment and an outlet near the opposite end of the casing and at the side thereof remote from the partition, the conduits being connected together adjacent to the inlet of the second mentioned compartment, the inlet of said connected conduits being located at the outlet side and near the inlet end of the second mentioned compartment, and the outlet of said connected conduits being located at the inlet side and near the inlet end of the first mentioned compartment.

5. A heat exchange device as set forth in claim 3 in which the respective compartments are divided into a series of connected passageways providing a tortuous path for a heating or cooling medium circulated through the compartments, and in which the conduits extend tortuously through said passageways.

6. A heat exchange device as set forth in claim 4 in which the respective compartments are divided into a series of connected passageways providing a tortuous path for a heating or cooling medium circulated through the compartments, and in which the conduits extend tortuously through said passageways.

CORNELIUS MORTENSEN.